(12) United States Patent
Kim (10) Patent No.: US 7,931,138 B2
(45) Date of Patent: Apr. 26, 2011

(54) AUTOMATIC TIRE TRANSFER APPARATUS USING TRAVERSER

(75) Inventor: Tae Yong Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 304 days.

(21) Appl. No.: 12/220,788

(22) Filed: Jul. 28, 2008

(65) Prior Publication Data

US 2009/0155031 A1 Jun. 18, 2009

(30) Foreign Application Priority Data

Dec. 14, 2007 (KR) ........................ 10-2007-0130556

(51) Int. Cl.
*B65G 15/58* (2006.01)

(52) U.S. Cl. ............. 198/468.6; 198/463.3; 198/468.11; 198/597

(58) Field of Classification Search ............... 198/468.6, 198/463.3, 468.11, 597
See application file for complete search history.

(56) References Cited

U.S. PATENT DOCUMENTS

| | | | | |
|---|---|---|---|---|
| 2,226,742 A | * | 12/1940 | Norton | 198/379 |
| 3,746,148 A | * | 7/1973 | Hilger et al. | 198/774.1 |
| 3,980,175 A | * | 9/1976 | D'Agnolo et al. | 198/444 |
| 4,067,453 A | * | 1/1978 | Moller | 414/22.61 |
| 4,519,505 A | * | 5/1985 | Thomas | 209/513 |
| 4,581,084 A | * | 4/1986 | Mukae et al. | 156/131 |
| 4,621,671 A | * | 11/1986 | Kane et al. | 157/1.1 |
| 4,702,669 A | * | 10/1987 | Ichikawa et al. | 198/468.6 |
| 4,704,064 A | * | 11/1987 | Hawley et al. | 414/592 |
| 4,739,874 A | * | 4/1988 | Akutagawa et al. | 198/468.2 |
| 4,747,743 A | * | 5/1988 | Dowding et al. | 414/403 |
| 4,821,865 A | * | 4/1989 | Hirata et al. | 198/368 |
| 4,836,386 A | * | 6/1989 | Smith | 209/564 |
| 4,865,180 A | * | 9/1989 | Brems et al. | 198/468.6 |
| 4,919,588 A | * | 4/1990 | Brun | 414/798.4 |
| 5,064,330 A | * | 11/1991 | Kumagai | 414/331.16 |
| 5,098,744 A | * | 3/1992 | Enegren | 427/327 |
| 5,147,177 A | * | 9/1992 | Kikuchi et al. | 414/788.3 |
| 5,178,255 A | * | 1/1993 | Carlson | 198/346.1 |
| 5,207,311 A | * | 5/1993 | Terai | 198/419.1 |
| 5,242,045 A | * | 9/1993 | Kakida et al. | 198/468.6 |
| 5,291,696 A | * | 3/1994 | Enegren | 451/83 |
| 5,305,080 A | * | 4/1994 | Lee et al. | 356/239.7 |

(Continued)

FOREIGN PATENT DOCUMENTS

JP 59-083274 5/1984

(Continued)

*Primary Examiner* — Joe Dillon, Jr.

(74) *Attorney, Agent, or Firm* — Edwards Angell Palmer & Dodge LLP; Peter F. Corless (57) ABSTRACT

An automatic tire transfer apparatus using a traverser comprises: a vertical lift adapted to lift and lower a tire from a tire storage place; a tire charge section adapted to be supplied with the tire from the vertical lift and adapted to automatically push the supplied tire in the progress direction of the tire; a traverser unit disposed at an outlet of the tire charge section and adapted to automatically transfer the tire supplied from the tire charge section in the progress direction of the tire while fixedly supporting the tire; a tire loader adapted to be supplied with the tire from the traverser unit and adapted to transfer the supplied tire to a tire assembling unit; and a controller adapted to control the overall operation of the tire charge section, the traverser unit and the tire loader.

6 Claims, 10 Drawing Sheets

U.S. PATENT DOCUMENTS

| | | | | |
|---|---|---|---|---|
| 5,350,128 A * | 9/1994 | Deters et al. | ............... | 242/473.6 |
| 5,437,529 A * | 8/1995 | Kakida et al. | .............. | 198/418.1 |
| 5,447,221 A * | 9/1995 | Winski | ..................... | 198/468.11 |
| 5,597,284 A * | 1/1997 | Weltlich et al. | ............ | 414/791.1 |
| 5,636,727 A * | 6/1997 | Neri et al. | .................... | 198/574 |
| 5,727,917 A * | 3/1998 | Fuke et al. | ............... | 414/331.13 |
| 5,735,389 A * | 4/1998 | Houzouji et al. | ............. | 198/809 |
| 5,959,868 A * | 9/1999 | Oppliger et al. | .............. | 700/226 |
| 6,253,907 B1 * | 7/2001 | Lachmann et al. | ...... | 198/750.14 |
| 6,390,278 B1 * | 5/2002 | Brown | ...................... | 198/463.3 |
| 7,143,890 B2 * | 12/2006 | Pellerin et al. | ................ | 198/373 |
| 7,275,635 B2 * | 10/2007 | Enya | ............................. | 198/572 |
| 2009/0257859 A1 * | 10/2009 | Kim | ........................... | 414/749.6 |
| 2009/0311355 A1 * | 12/2009 | Hineno et al. | ............... | 425/58.1 |

FOREIGN PATENT DOCUMENTS

| | | |
|---|---|---|
| JP | 07-157091 | 6/1995 |
| JP | 08-143140 | 6/1996 |
| JP | 09-077262 | 3/1997 |
| KR | 10-2004-0028378 | 4/2004 |

* cited by examiner

AUTOMATIC TIRE TRANSFER APPARATUS USING TRAVERSER

CROSS-REFERENCE TO RELATED APPLICATION

This application claims the benefit under 35 U.S.C. §119 (a) of Korean Patent Application No. 10-2007-0130556 filed on Dec. 14, 2007, the entire contents of which are incorporated herein by reference.

BACKGROUND (a) Technical Field

The present invention relates to au automatic tire transfer apparatus using a traverser. More particularly, the present invention relates to an automatic tire transfer apparatus using a traverser which can transfer a tire to a position of a tire loader without causing the apparatus to be damaged due to an impact during the transfer.

(b) Background Art

Figure 1:
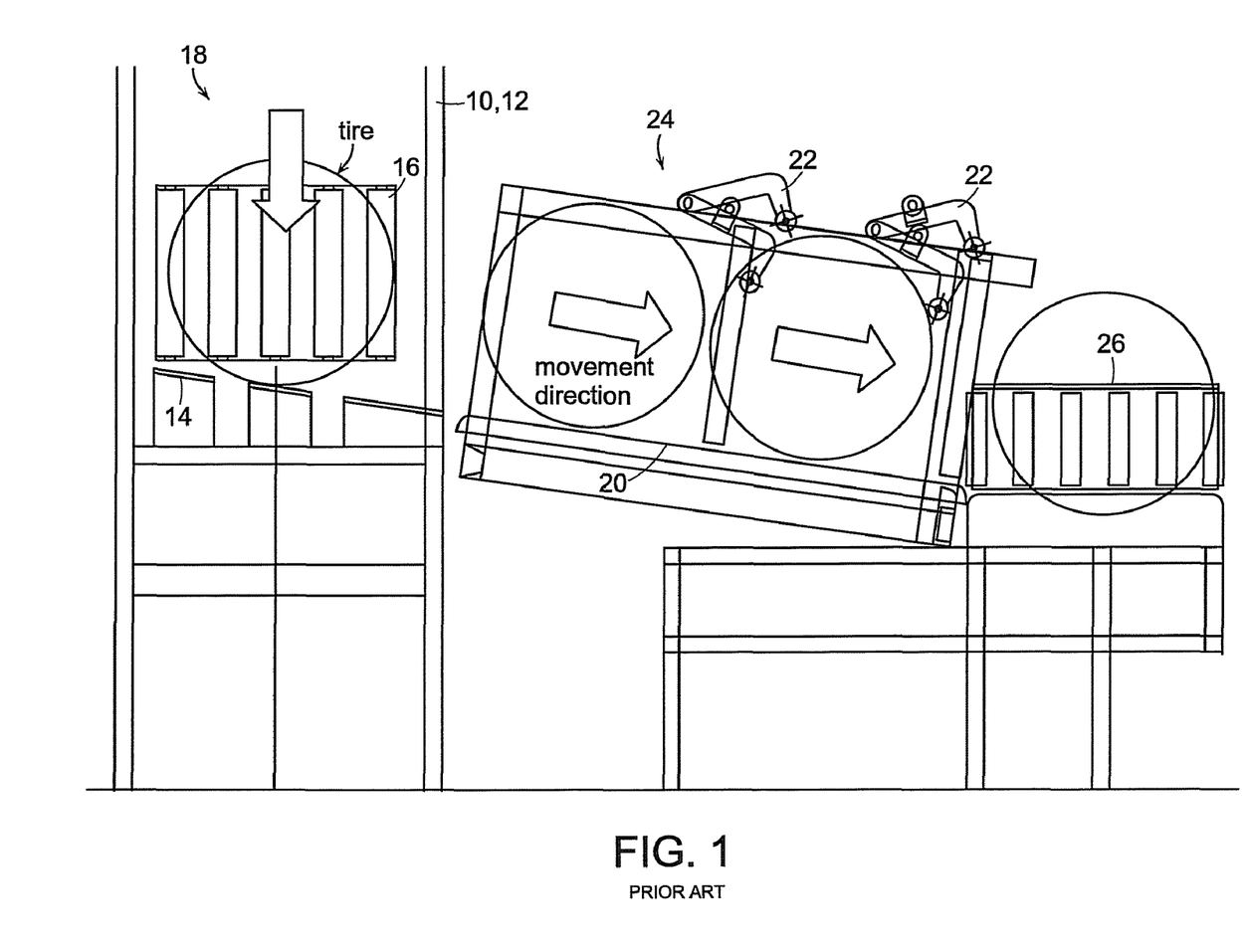
FIG. 1 is a schematic diagrammatic view showing a conventional automatic tire transfer apparatus according to the prior art.

As shown in FIG. 1, in an assembly process of a complete vehicle, a conventional tire carrying-out apparatus for the automatic transfer of a tire to an assembly position includes a vertical lift 10 and a chain guide 12 adapted to lift and lower a tire from a tire storage place; a tire charge section 18 having an inclined bracket 14 mounted at the bottom thereof and a guide roller 16 mounted at the front and rear sides thereof so as to rollingly guide the tire in the progress direction of the tire; a tire loader 24 having an inclined rail 20 mounted at a discharge portion side of the tire charge section 18 in such a fashion as to be disposed adjacent to the inclined bracket 14 and a seesaw stopper 22 mounted to restrain the advance of the tire; and a turntable 26 mounted at an outlet side of the tire loader 24 so as to feed the tire to an assembly position.

The conventional tire carrying-out apparatus is operated as follows. First, a tire assembly is seated on the inclined bracket 14 of the tire charge section 18 from a tire storage place by means of the chain guide 12. Then, an individual tire seated on the inclined bracket 14 is automatically rolled down along the guide roller 16 of the tire loader 24 toward the turntable 26 by means of the rolling guide operation of the guide roller 16. In this case, the tire is in a state of being positioned on the inclined rail 20 and simultaneously being temporarily stopped by means of a clamping operation of the seesaw stopper 22, i.e., in a state of being loaded on the tire loader 24.

Subsequently, when a signal indicating that the loading of the tire on the tire loader 24 has been completed is applied to a controller, the clamping operation of the seesaw stopper is released by a control signal from the controller. As the clamping operation of the seesaw stopper is released, the tire is moved to the turntable 26 such that it is transferred to a tire assembly position for the post-process.

However, such a conventional tire carrying-out apparatus entails problems in that when the tire is automatically discharged from the tire charge section and is fed to the inclined rail of the tire loader, the seesaw stopper is damaged due to an impact upon the feed of the tire, thereby resulting in a suspension of the operation of an assembly line for the sake of the replacement of the damaged seesaw stopper. In addition, when the tire is seated on the inclined bracket of the tire charge section or is automatically discharged from the tire charge section to the inclined rail of the tire loader, the guide roller is damaged due to an impact when the tire collides against the guide roller, thereby leading to a deterioration of an assembly line operating ratio due to the replacement of the damaged guide roller.

The information disclosed in this Background section is only for enhancement of understanding of the background of the invention and should not be taken as an acknowledgment or any form of suggestion that this information forms the prior art that is already known to a person skilled in that art.

SUMMARY OF THE DISCLOSURE

The present invention has been made in an effort to solve the above problems occurring in the prior art, and it is an object of the present invention to provide an automatic tire transfer apparatus using a traverser, which can prevent such deterioration of an assembly line operating ratio due to a damage of the seesaw stopper or the guide roller and significantly improve workability in an assembly process of a complete vehicle.

In order to accomplish the above object, the present invention provides an automatic tire transfer apparatus using a traverser, comprising: a vertical lift adapted to lift and lower a tire from a tire storage place; a tire charge section adapted to be supplied with the tire from the vertical lift and adapted to automatically push the supplied tire in the progress direction of the tire; a traverser unit disposed at an outlet of the tire charge section and adapted to automatically transfer the tire supplied thereto from the tire charge section in the progress direction of the tire while fixedly supporting the tire; a tire loader adapted to be supplied with the tire from the traverser unit and adapted to transfer the supplied tire to a tire assembling unit; and a controller adapted to control the overall operation of the tire charge section, the traverser unit and the tire loader.

Preferably, the tire charge section may comprise: a first accum roller mounted at the bottom thereof so as to allow the tire lowered from the vertical lift to be seated thereon; a first photosensor adapted to detect a state where the tire is seated on the first accum roller and transmit a signal indicative of the detection to a controller; and an automatic push cylinder adapted to push the tire to the traverser unit in response to a control signal form the controller.

Suitably, the traverser unit may comprise: a second photosensor adapted to detect a state where the tire is supplied from the tire charge section to the traverser unit by the automatic push cylinder unit of the tire charge section; a support plate mounted at the bottom thereof and adapted to fixedly support the bottom surface of the tire supplied from the tire charge section; up and down cylinders each mounted at a bottom surface of the support plate so as to allow the support plate to be inclined in one side; and a forward and rearward movable cylinder adapted to feed the support plate to the position of the tire loader.

The traverser unit further comprises a post mounted vertically at an outer distal end of the support plate so as to prevent the tire from escaping to the outside.

The traverser unit may, preferably, further comprise a second accum roller mounted at an inside surface of a vertical frame installed vertically integrally at the front and rear ends of the support plate thereof so as to rollingly support the tire.

Suitably, the automatic tire transfer apparatus may further comprise a limit switch attached to the tire loader and adapted to be switched at the moment when the feed of the support plate of the traverser unit to the tire loader is completed Also suitably, the automatic tire transfer apparatus may further comprise a clamping unit disposed adjacent to the limit switch so as to clamp the tire loader in response to a signal indicative of the detection of the second photosensor and release the clamping state of the tire loader by the switching operation of the limit switch.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The present systems will be particularly useful with a wide variety of motor vehicles.

The above and other aspects of the invention are discussed infra.

Reference numerals set forth in the Drawings includes reference to the following elements as further discussed below:

| | |
|---|---|
| 100: vertical lift | 102: chain guide |
| 200: tire charge section | 202: first accum roller |
| 204: front and rear frame | 206: automatic push cylinder unit |
| 208: left frame | 300: traverser unit |
| 302: support plate | 304: vertical frame |
| 306: second accum roller | 308: up cylinder |
| 310: down cylinder | 312: post |
| 314: second photosensor | 316: support frame |
| 318: forward and rearward movable cylinder | |
| 320: lift switch | 400: tire loader |
| 500: tire | 600: clamping unit |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
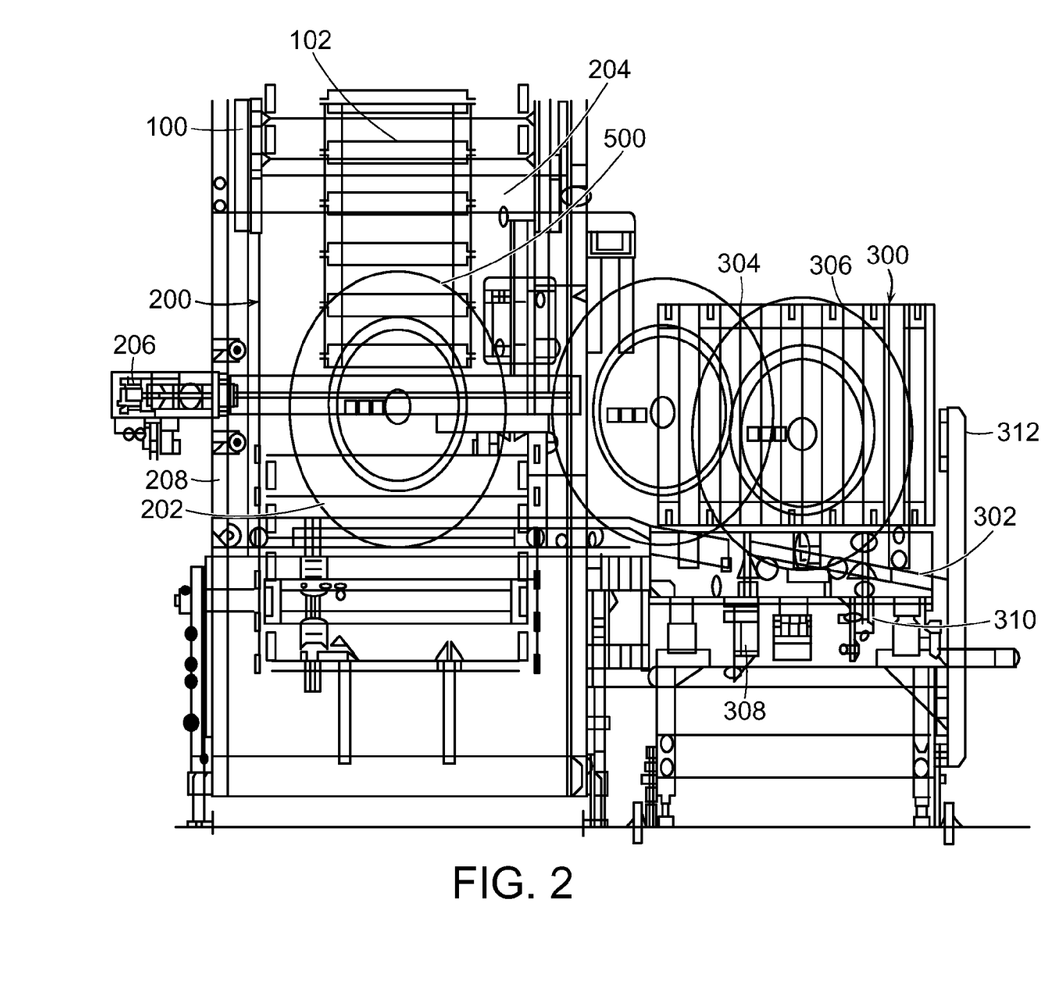
FIG. 2 is a front view showing an automatic tire transfer apparatus using a traverser according to the present invention.
Figure 3:
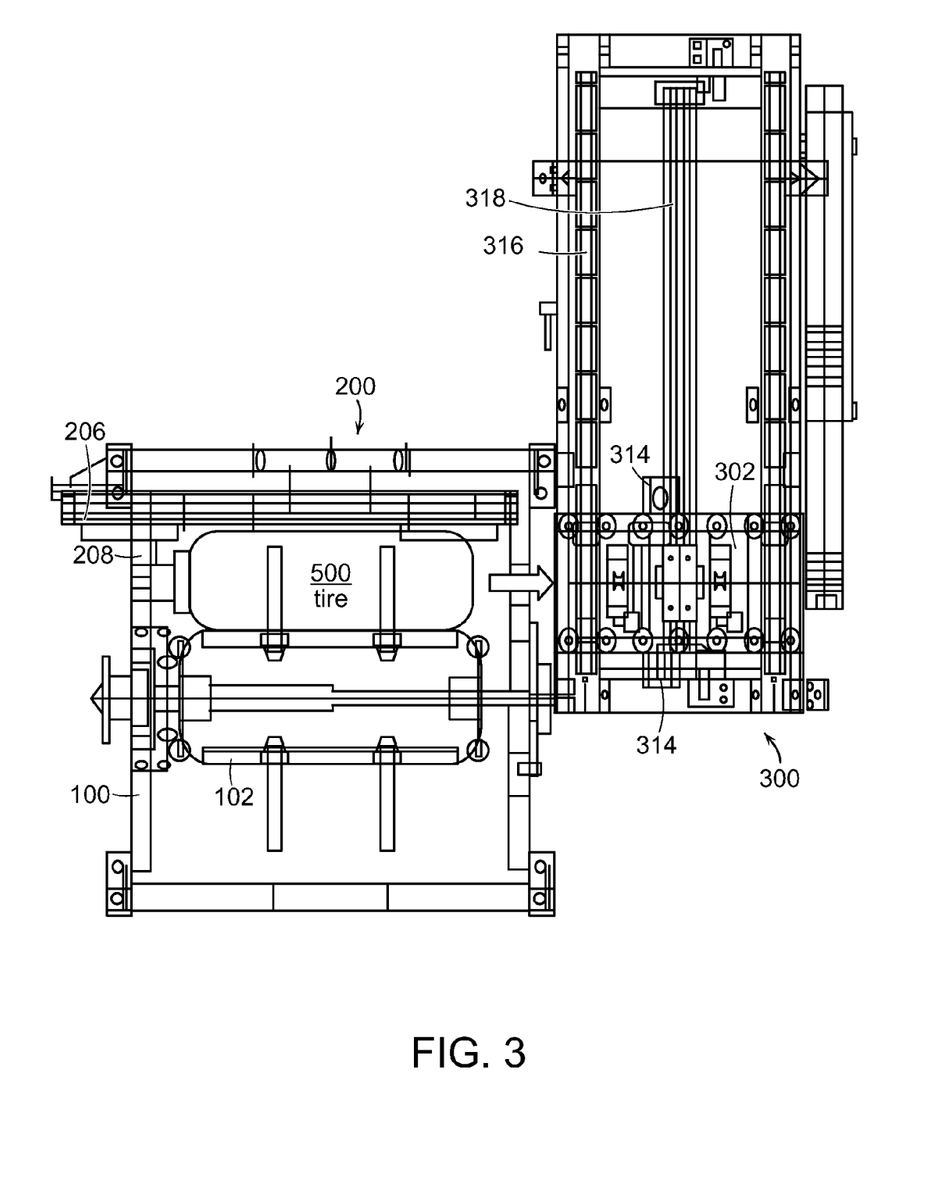
FIG. 3 is a top plan view showing an automatic tire transfer apparatus using a traverser according to the present invention.
Figure 4:
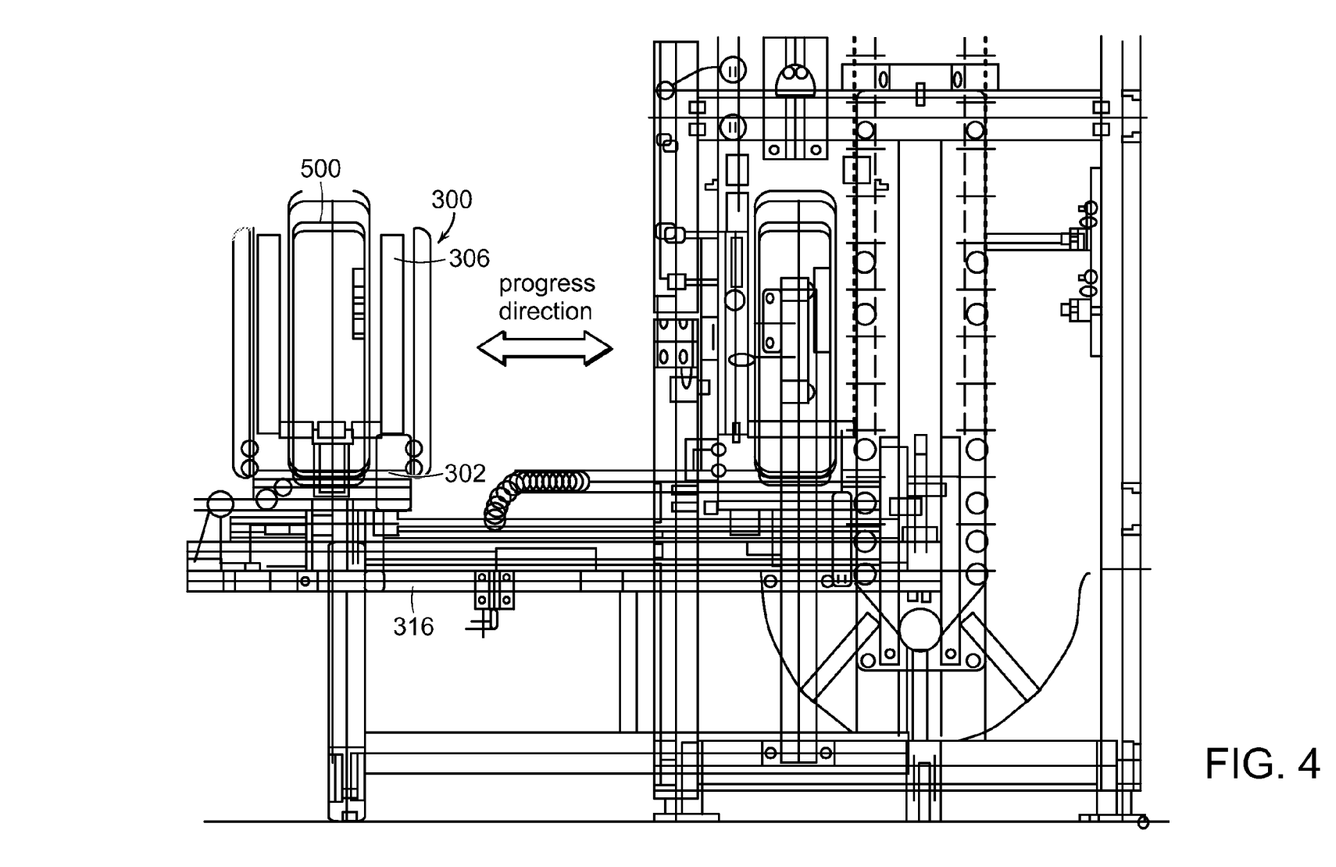
FIG. 4 is a left side view showing an automatic tire transfer apparatus using a traverser according to the present invention.

FIG. 2 is a front view showing an automatic tire transfer apparatus using a traverser according to the present invention, FIG. 3 is a top plan view showing an automatic tire transfer apparatus using a traverser according to the present invention, and FIG. 4 is a left side view showing an automatic tire transfer apparatus using a traverser according to the present invention.

An automatic tire transfer apparatus using a traverser of the present invention includes a vertical lift 100, a tire charge section 200, a traverser unit 300 and a tire loader 400.

The vertical lift 100 lifts and lowers a tire from a tire storage place and supplies the tire to the tire charge section 200. The tire charge section 200 is supplied with the tire from the vertical lift 100 and automatically pushes the supplied tire in the progress direction of the tire so as to allow the tire to be fed to the traverser unit 300. The traverser unit 300 automatically feeds the tire supplied thereto from the tire charge section to the tire loader while fixedly supporting the tire. The tire loader 400 is supplied with the tire from the traverser unit and feeds the supplied tire to a tire assembly position.

The vertical lift 100 is a device which includes a chain guide 102 to carry out a tire one by one from a tire storage place to allow the carried tire to be fed to the tire charge section. The vertical lift 100 supplies the tire 500 to the tire charge section 100 at a predetermined speed.

The tire charge section 200 is configured to automatically push the tire 500 lowered from the vertical lift 100 in the progress direction of the tire. The tire charge section 200 includes a first accum roller 204 mounted at the bottom thereof so as to allow the tire 500 lowered from the vertical lift 100 to be seated thereon, and a first photosensor (not shown) mounted at a front and rear frame 204 of the tire charge section 200 so as to detect a state where the tire is seated on the first accum roller 202 to transmit a signal indicative of the detection to a controller (not shown).

Specifically, the tire charge section 200 includes an automatic push cylinder 206 mounted at a left frame 208 thereof and pushes the tire to the traverser unit in response to a control signal form the controller.

The traverser unit 300 is disposed at an outlet of the tire charge section 200 and feeds the tire supplied thereto from the tire charge section 200 to the tire loader 400. The traverser unit 300 includes a support plate 302 mounted at the bottom thereof to allow the tire to be seated thereon and a second accum roller 306 mounted at an inside surface of a vertical frame 304 installed vertically integrally at the front and rear ends of the support plate 302 so as to rollingly support the tire.

Particularly, an up cylinder 308 and a down cylinder 310 are mounted side by side at the bottom surface of the support plate 302 so as to allow the support plate to be inclined in one side to fixedly support the tire.

In addition, the traverser unit 300 further includes a post 312 mounted vertically at an outer distal end of the support plate 302 so as to prevent the tire from escaping to the outside.

In this case, the traverser unit 300 includes a second photosensor 314 mounted at an inside surface of the vertical frame 304 thereof so as to detect a state where the tire is supplied from the tire charge section to the traverser unit by the automatic push cylinder unit 206 of the tire charge section 200 to transmit a signal indicative of the detection to the controller.

Moreover, the support plate 302 of the traverser unit 300 is coupled to the support frame 316 positioned below the support plate in such a fashion as to be forward and rearward moved. A forward and rearward movable cylinder 318 is mounted at the support frame 316 so as to feed the support plate 302 to the position of the tire loader 400.

In the meantime, a limit switch 320 is attached to the tire loader and is pressed by the support plate 302 of the traverser unit 300 so as to be switched at the moment when the feed of the support plate 302 of the traverser unit 300 to the tire loader 400 is completed. Further, the a clamping unit 600 is disposed adjacent to the limit switch 320 so as to clamp the tire loader 400 in response to a signal indicative of the detection of the second photosensor 314 and release the clamping state of the tire loader by the switching operation of the limit switch 320.

The operation of the tire charge section 200, the traverser unit 300, the tire loader 400 and the like is performed under the control of the controller that receives signals from the first and second photosensors and the limit switch.

Here, the operation process of the automatic tire transfer apparatus of the present invention as constructed above will be described hereinafter.

Figure 5:
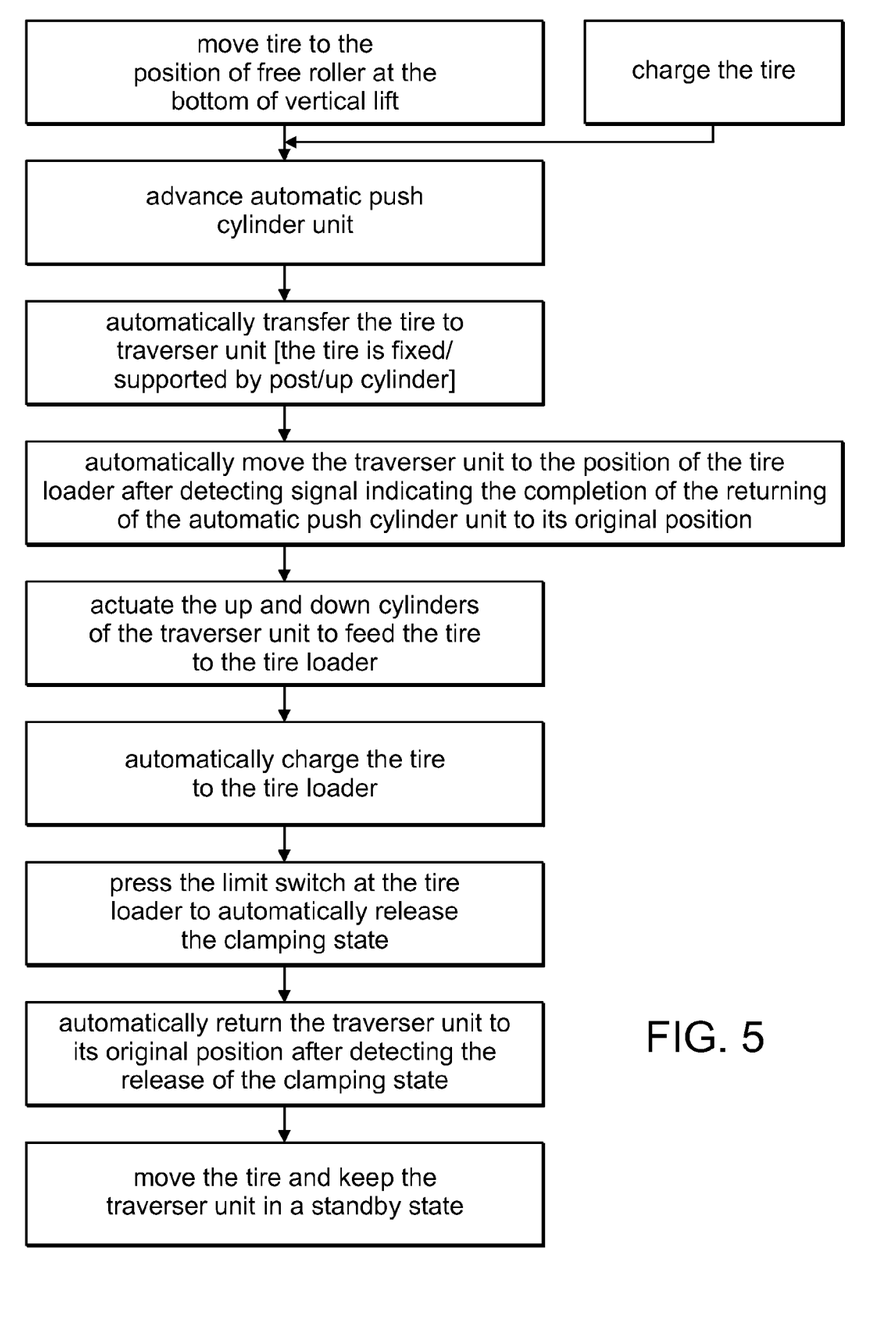
FIG. 5 is a flowchart showing the operation process of an automatic tire transfer apparatus using a traverser according to the present invention.

FIG. 5 is a flowchart showing the operation process of an automatic tire transfer apparatus using a traverser according to the present invention, and FIGS. 6 to 10 are views showing sequentially the operation of an automatic tire transfer apparatus using a traverser according to the present invention.

Figure 6:
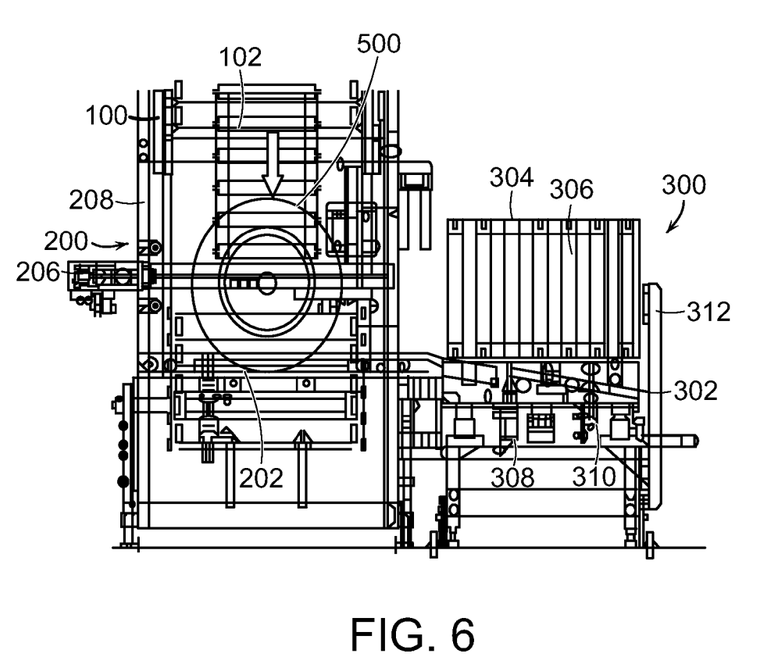
FIGS. 6 to 10 are views showing sequentially the operation of an automatic tire transfer apparatus using a traverser according to the present invention.
Figure 6A:
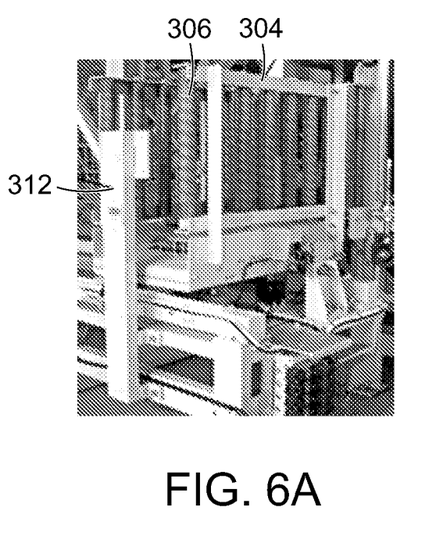

First, when the vertical lift 100 supplies a tire 500 one by one to the tire charge section 200, the tire 500 is seated on the first accum roller 202 mounted at the bottom of the tire charge section 200.

Next, at the moment when the tire 500 is seated on the first accum roller 202, the first photosensor (not shown) mounted at the front and rear frame 204 of the tire charge section 200 detects a state where the tire 500 is seated on the first accum roller 202 and transmit a signal indicative of the detection of the first photosensor to the controller.

Figure 7:
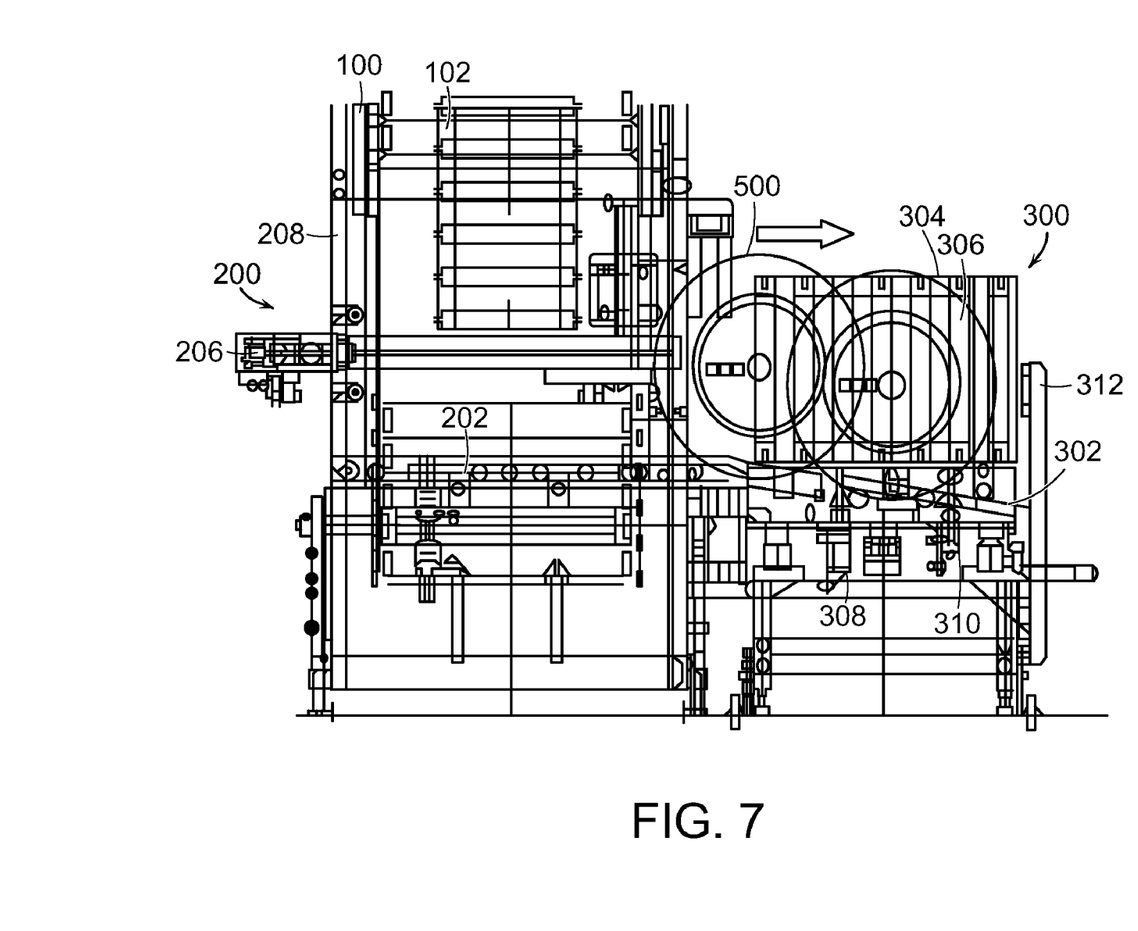

Then, when the controller transmits a drive control signal to the automatic push cylinder unit 206 mounted at the left frame 208 of the tire charge section 200, the automatic push cylinder unit 206 pushes the tire 500 to the traverser unit 300.

Figure 8:
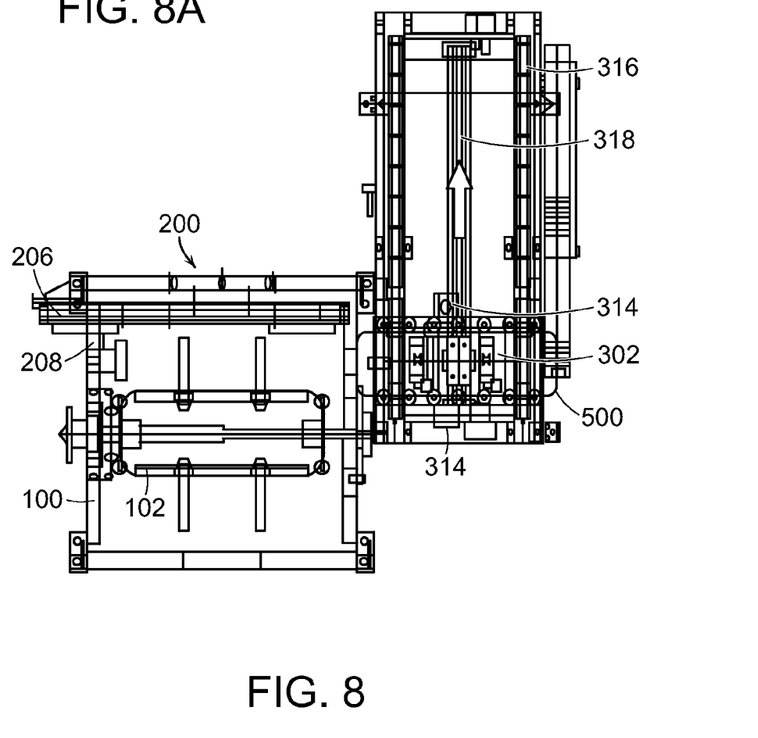
Figure 8A:
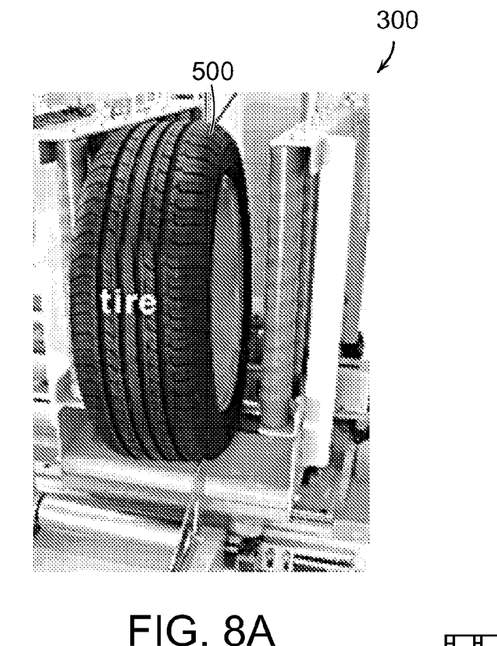

Subsequently, when the tire 500 supplied from the tire charge section 200 is seated on the support plate 302 of the traverser unit 300, the second photosensor 314 detects a state where the tire is seated on the support plate 302 and transmits a signal indicative of the detection to the controller.

In this case, the up cylinder 308 and the down cylinder 310 mounted at the bottom surface of the support plate 302 are lifted and lowered, respectively, in response to a control signal from the controller to cause the support plate 302 to be inclined in one side.

That is, one side (oriented toward the tire charge section) of the support plate 302 is upwardly moved by means of the lifting operation of the up cylinder 308, and the other side of the support plate 302 is downwardly moved by means of the lowering operation of the down cylinder 310, such that the support plate 302 forms a slopping surface whose one side (oriented toward the tire charge section) is high and whose other side is low. As a result, the tire 500 fed from the tire charge section 200 to the traverser unit 300 is fixedly supported on the support plate 302 by means of the up cylinder and the down cylinder.

More specifically, the bottom surface of the tire 500 is supported by the support plate 302 forming the slopping surface whose one side (oriented toward the tire charge section) is high and whose other side is low, and simultaneously the outer peripheral surface of the tire is prevented from escaping to the outside by the post 312 mounted vertically at an outer distal end of the support plate 302 prevent the tire from escaping to the outside, such that the tire 500 is kept fixed on the support plate 302.

Figure 9:
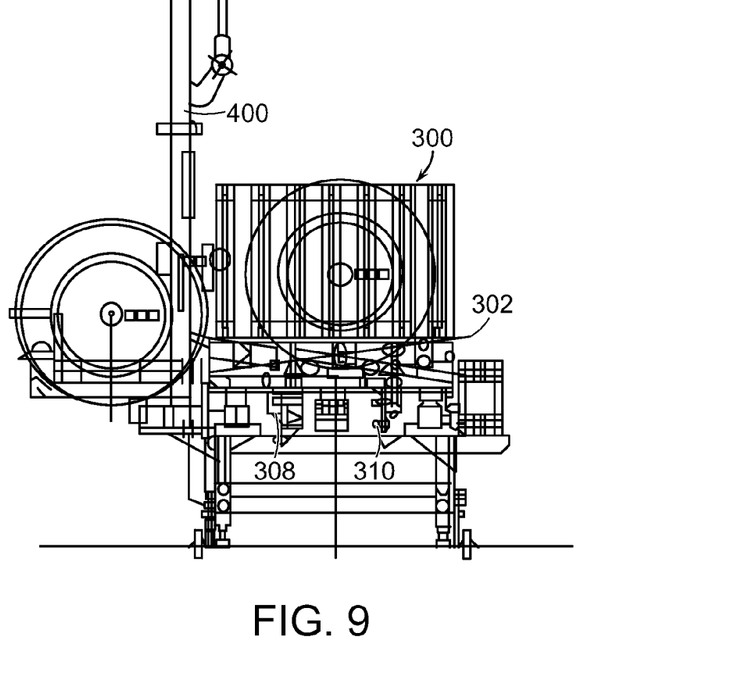
Figure 9A:
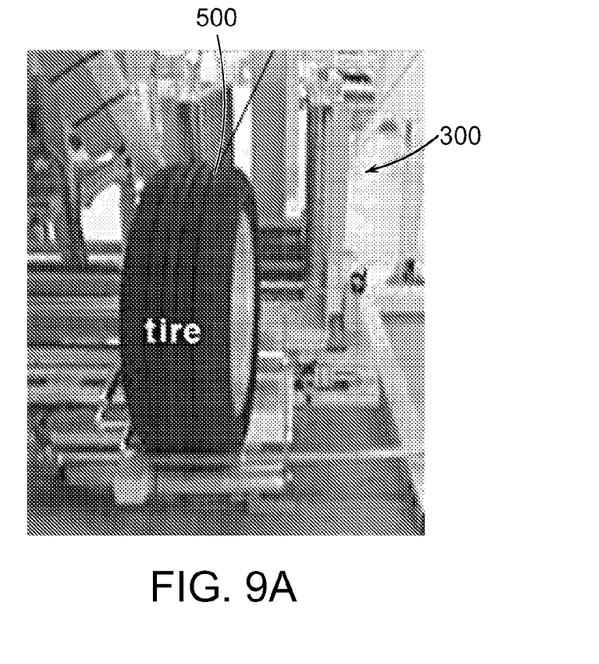

Subsequently, when the controller transmits a drive control signal to the forward and rearward movable cylinder 318 in response to the detection signal from the second photosensor 314, the support plate 302 is fed to the tire loader 400 by means of the forward and rearward movable cylinder 318.

Figure 10:
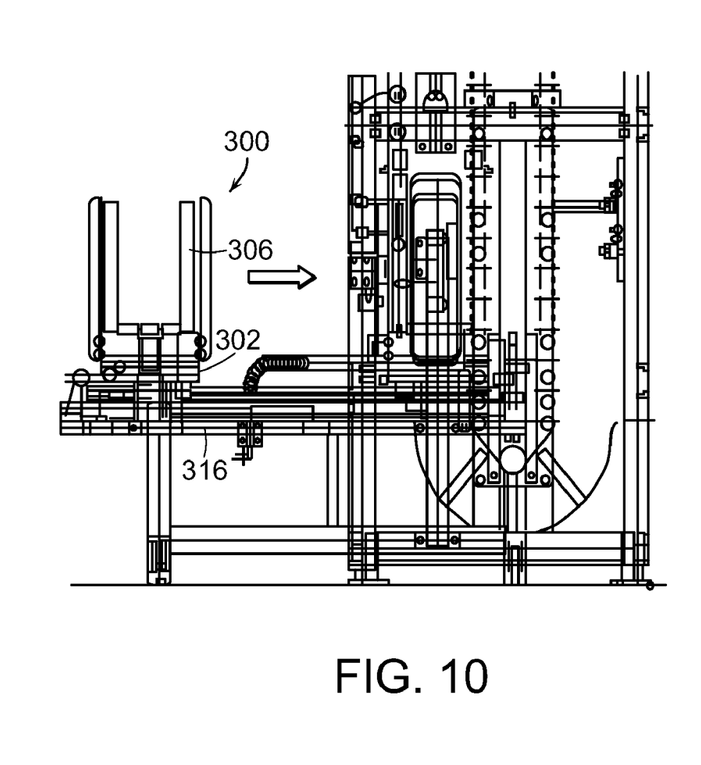
Figure 10A:
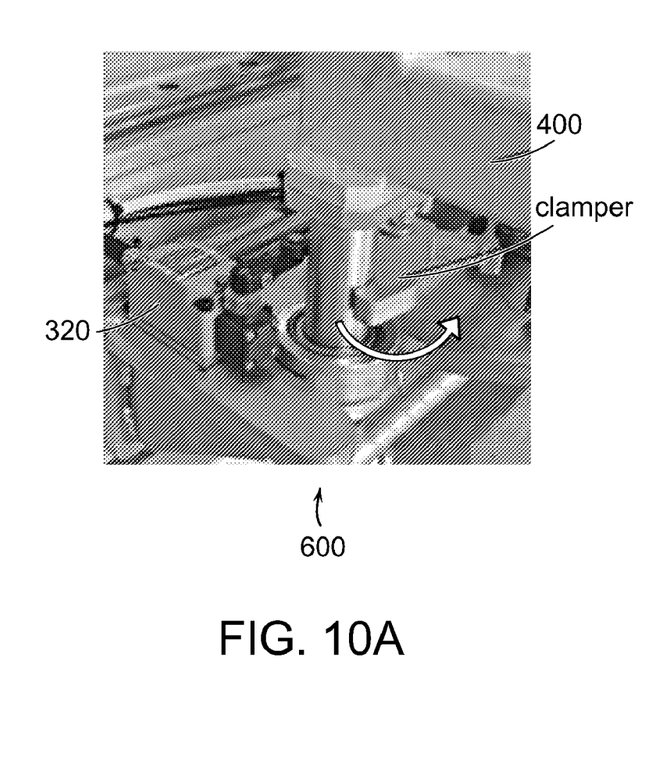

Concurrently, at the moment when the transfer of the support plate 302 and the tire 500 to the tire loader 400 is completed, the limit switch 320 is switched. At this time, when the controller applies a drive control signal to the to the up cylinder 308 and the down cylinder 310 mounted at the bottom of the support plate 302 after detecting the switching operation of the limit switch 320, the up cylinder 308 and the down cylinder 310 are lowered and lifted, respectively. As a result, the support plate 302 is downwardly moved at one side thereof and upwardly moved at the other side thereof to form a sloping surface opposite to the slopping surface whose one side (oriented toward the tire charge section) is high and whose other side is low, such that the tire is rolled toward the tire loader 400 and is loaded on the tire loader 400.

In this case, at the moment when the limit switch 320 is switched, the clamped and fixed state of the tire loader 400 by the clamping unit 600 is released.

Finally, after the clamping operation of the clamping unit 600 has been released, the controller receives a signal indicating the release of the clamping operation and transmits a reverse drive control signal to the forward and rearward movable cylinder 318. Then, the support plate 302 of the traverser unit 300 that allowed the tire 500 to be loaded on the tire loader 400 returns to its original position and is in a standby state for the transfer of the next tire.

Like this, the tire can be smoothly transferred to the tire loader so as to always maximally maintain a tire assembly line operating ratio.

As described above, according to an automatic tire transfer apparatus using a traverser, a tire supplied to the tire charge section from a vertical lift is automatically transferred to a traverser unit by means of the automatic push cylinder, and the traverser unit is automatically moved to the position of a tire loader by means of the forward and rearward movable cylinder while being supported by the up cylinder and the down cylinder to cause the tire to be easily fed to a tire assembly process line, thereby preventing a deterioration of an assembly line operating ratio due to a damage of the seesaw stopper or the guide roller caused by a repeated impact upon the automatic discharged of the tire along the inclined rail in the prior art.

Besides, the replacement work of the conventional seesaw stopper and guide roller is excluded to thereby significantly improving workability in an assembly process of a complete vehicle.

The invention has been described in detain with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An automatic tire transfer apparatus using a traverser, comprising:
   a vertical lift adapted to lift and lower a tire from a tire storage place;
   a tire charge section adapted to be supplied with the tire from the vertical lift and adapted to automatically push the supplied tire in the progress direction of the tire;
   a traverser unit disposed at an outlet of the tire charge section and adapted to automatically transfer the tire supplied from the tire charge section in the progress direction of the tire while fixedly supporting the tire;
   a tire loader adapted to be supplied with the tire from the traverser unit and adapted to transfer the supplied tire to a tire assembling unit; and
   a controller adapted to control the overall operation of the tire charge section, the traverser unit and the tire loader,
   wherein the traverser unit comprises:
   a photosensor adapted to detect a state where the tire is supplied from the tire charge section to the traverser unit by the automatic push cylinder unit of the tire charge section;
   a support plate mounted at the bottom thereof and adapted to fixedly support a bottom surface of the tire supplied from the tire charge section;
   up and down cylinders each mounted at a bottom surface of the support plate so as to allow the support plate to be inclined in one side; and
   a forward and rearward movable cylinder adapted to feed the support plate to the tire loader.

2. The apparatus of claim 1, wherein the tire charge section comprises:
- a first accum roller mounted at the bottom thereof so as to allow the tire lowered from the vertical lift to be seated thereon;
- a first photosensor adapted to detect a state where the tire is seated on the first accum roller and transmit a signal indicative of the detection to a controller; and
- an automatic push cylinder adapted to push the tire to the traverser unit in response to a control signal form the controller.

3. The apparatus of claim 1, wherein the traverser unit further comprises a post mounted vertically at an outer distal end of the support plate so as to prevent the tire from escaping to the outside.

4. The apparatus of claim 1, wherein the traverser unit further comprises a second accum roller mounted at an inside surface of a vertical frame installed vertically integrally at the front and rear ends of the support plate thereof so as to rollingly support the tire.

5. The apparatus of claim 1, further comprising a limit switch attached to the tire loader and adapted to be switched at the moment when the feed of the support plate of the traverser unit to the tire loader is completed.

6. The apparatus of claim 5, further comprising a clamping unit disposed adjacent to the limit switch so as to clamp the tire loader in response to a signal indicative of the detection of the second photosensor and release the clamping state of the tire loader by the switching operation of the limit switch.

* * * * *